No. 731,366. PATENTED JUNE 16, 1903.
H. A. HOUSE.
NUT LOCK.
APPLICATION FILED JAN. 7, 1903.
NO MODEL.
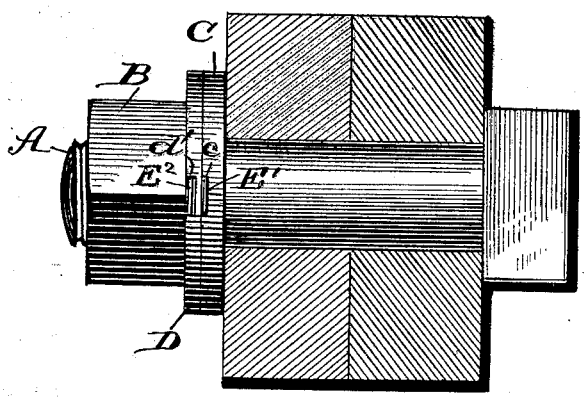
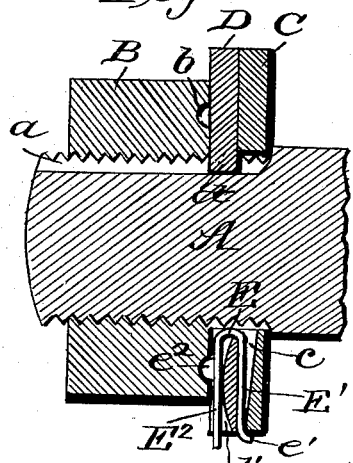
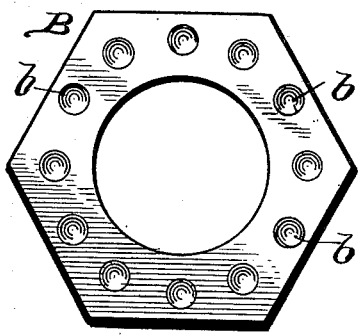
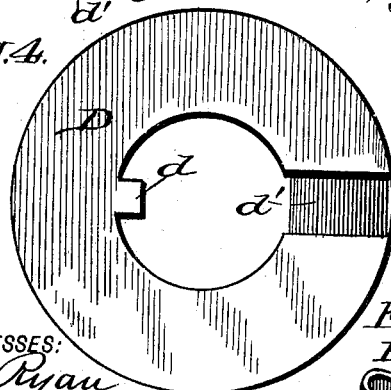
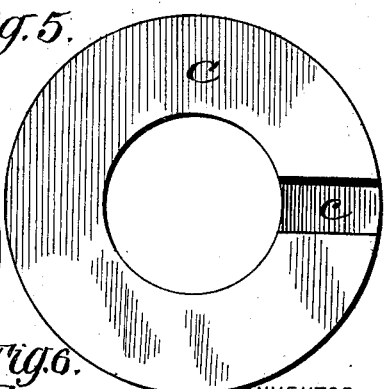
WITNESSES:
Jos. A. Ryan
Geo. S. Brock.
INVENTOR
Harry A. House.
BY Munn & Co.
ATTORNEYS.
THE NORRIS PETERS CO., PHOTO-LITHO., WASHINGTON, D. C.

No. 731,366. Patented June 16, 1903.

UNITED STATES PATENT OFFICE.

HARRY A. HOUSE, OF ASPEN, COLORADO, ASSIGNOR OF FIVE-TWELFTHS TO ROBERT E. SMITH AND JAMES A. EDDY, OF ASPEN, COLORADO.

NUT-LOCK.

SPECIFICATION forming part of Letters Patent No. 731,366, dated June 16, 1903.

Application filed January 7, 1903. Serial No. 138,121. (No model.)

*To all whom it may concern:*

Be it known that I, HARRY A. HOUSE, of Aspen, in the county of Pitkin and State of Colorado, have invented a new and useful Improvement in Nut-Locks, of which the following is a specification.

My invention relates to an improvement in nut-locks, and has for its object to provide a simple, cheap, and efficient locking device for nuts which will effectually prevent retrograde movement thereof and which will permit the nut to be readily applied or removed.

My invention consists in certain novel features of construction, as will be hereinafter fully described, and pointed out in the claims.

In the drawings, Figure 1 is a side elevation of the device in use. Fig. 2 is an enlarged central longitudinal section of the end of a bolt with the nut and lock applied. Fig. 3 is a bottom plan view of the nut. Fig. 4 is a plan view of the outer face of washer D. Fig. 5 is a similar view of the washer C. Fig. 6 is a detail perspective view of the spring-plate pawl E.

A designates the bolt, which is provided with a longitudinal groove or channel $a$ throughout the length of its threaded end, on which is to be screwed in the usual manner the nut B, said nut having on its lower face the circular row of pits or depressions $b$, the purpose of which will be hereinafter more fully explained.

C represents a lower washer having a central opening, and the outer face of said washer is provided with a transverse groove or channel $c$, extending from the central opening to the circumference thereof. The bottom or bed of said groove slopes or trends gradually toward the center of the washer, thus making the groove deeper at its inner end than at the outer, as plainly shown in Fig. 2.

D represents an outer washer made of suitable material and has a central opening and a tongue $d$ projecting into said opening. Tongue $d$ is similar in shape to the groove $a$ in bolt A. The washer D has in its outer face a groove or channel $d'$, preferably diametrically opposite the tongue $d$. The bed or bottom of said groove or channel $d'$ is preferably curved, sloping inwardly toward the central opening and outwardly to the circumference of the washer.

E is a spring locking-pawl consisting of a strip of spring-steel bent upon itself, as shown, forming inner and outer leaves E' and E², respectively. Projecting from the face of the outer leaf E² is the teat or lug $e^2$, and the free end of the inner leaf E' is bent over to form a lip or retaining-flange $e'$.

To use my improved nut-lock, the bolt having been placed in position where desired the washer C is passed over the threaded end of the bolt and slid along same until it rests against the object through which the bolt passes. The spring-pawl E having been placed in position in the groove $d'$ of washer D, said washer is now slid along the bolt, the tongue $d$ fitting in the groove $a$ of the bolt, until it meets the washer C, when the inner leaf E' of pawl E will seat itself in the channel $c$ of washer C, the overturned lip of flange $e'$ fitting over the periphery of said washer C. The nut B is now screwed on the bolt until it meets the washer D, when the teat or lug $e^2$ will spring into and seat itself in one of the pits or depressions $b$ in the inner face of said nut and securely lock it against retrograde movement or unscrewing. The tongue $d$ of washer D prevents said washer from turning on the bolt, and the side walls of the channels $c$ and $d'$ prevent the spring-pawl E from moving sidewise, while the lip or flange $e'$ prevents the said pawl from moving inwardly toward the bolt, thus maintaining the teat $e^2$ in its proper position relative to the pits or depressions $b$ in the inner face of the nut B. To unlock the nut, any suitable tool or instrument is used to force the outer end of the leaf E² of the pawl inwardly against the bed of the groove $d'$, thus withdrawing the teat or lug $e^2$ from the pit or depression in said nut in which it has been seated.

Having thus described my invention, what I claim as new, and desire to secure by Letters Patent, is—

1. The combination in a nut-lock, with a bolt having a longitudinal groove in its threaded portion, of a washer having a central opening and a tongue projecting therein to fit said longitudinal groove and provided with a transverse channel or groove in its outer face, a spring-plate doubled upon itself forming two leaves the inner leaf of said spring-plate resting against the inner face of said washer, the outer leaf of said plate seated in the channel or groove in the outer face of said washer and provided with a teat or projection on its outer face, and a nut having pits or depressions in its inner face into which the teat or lug on said spring-plate is adapted to seat itself and thereby prevent the unscrewing of said nut.

2. The combination in a nut-lock, with a bolt having a longitudinal groove in its threaded portion, of an inner washer, having a central opening and provided with a transverse channel or groove in its outer face, an outer washer having a central opening and a tongue projecting therein, and provided with a transverse channel or groove in its outer face extending from the central opening to its periphery, a spring-plate doubled upon itself to form inner and outer leaves and embrace said outer washer, the inner leaf of said spring-plate being seated in the groove or channel in the outer face of the inner washer, the outer leaf of said spring-plate seated in the channel or groove in the outer face of the outer washer and provided with a teat or projection on its outer face, and a nut provided with a circular series of pits or depressions in its inner face into which the teat or projection on the outer leaf of the spring-plate is adapted to spring and lock the nut against unscrewing.

3. The combination in a nut-lock with a bolt having a longitudinal groove in its threaded portion, of a washer having a central opening and a tongue projecting therein and provided with a transverse groove or channel in its outer face, the bed or bottom of said channel sloping oppositely toward the central opening and the periphery of said washer, a spring-plate doubled upon itself forming inner and outer leaves, and seated in said transverse channel or groove, the inner leaf passing under the inner face of the washer, the outer leaf resting in said transverse channel or groove and provided on its outer surface with a teat or lug, and a nut having a circular series of pits or depressions in its inner face into which the teat or lug of the outer leaf of the spring pawl or plate is adapted to spring and lock the nut against unscrewing, and whereby a tool may be used to force the said outer leaf within the transverse channel or groove of the washer, to withdraw the teat or projection from the pit or depression of the nut, and permit it to be unscrewed.

4. The combination in a nut-lock with a bolt having a threaded end portion, of a washer having a central opening, means for preventing its rotation with respect to the bolt, and provided with a transverse groove or channel in its outer face, a spring-plate doubled on itself forming two leaves, the inner leaf provided with a rearwardly-turned lip at its free end, the outer leaf of said spring-plate seated in the channel or groove in the outer face of the washer, and provided with a teat or projection on its outer face, and a nut having pits or depressions in its inner face into which the teat or lug on said spring-plate is adapted to seat itself and thereby prevent the unscrewing of said nut.

HARRY A. HOUSE.

Witnesses:
JAY T. MILLER,
WILLIAM R. MASON.